(12) United States Patent
Graf et al.

(10) Patent No.: US 11,539,118 B2
(45) Date of Patent: Dec. 27, 2022

(54) MULTI-POLARIZATION HF NVIS FOR VERTICAL LIFT AIRCRAFT

(71) Applicant: Rockwell Collins, Inc., Cedar Rapids, IA (US)

(72) Inventors: Joseph T. Graf, Center Point, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 24 days.

(21) Appl. No.: 17/159,683

(22) Filed: Jan. 27, 2021

(65) Prior Publication Data

US 2022/0238986 A1 Jul. 28, 2022

(51) Int. Cl.
*H01Q 1/28* (2006.01)
*H04B 17/336* (2015.01)
*H01Q 1/50* (2006.01)

(52) U.S. Cl.
CPC ............. *H01Q 1/286* (2013.01); *H01Q 1/287* (2013.01); *H01Q 1/50* (2013.01); *H04B 17/336* (2015.01)

(58) Field of Classification Search
CPC ...... H01Q 1/286; H01Q 9/0435; H01Q 13/18; H01Q 17/336; H01Q 21/061; H01Q 1/281; H01Q 3/24; H01Q 21/0025; H01Q 25/00; H01Q 21/24; H01Q 21/20; H01Q 21/205; H01Q 21/0006; H01Q 21/065; H01Q 3/26; H01Q 21/062; H01Q 3/46; H01Q 21/0093; H01Q 1/28; H01Q 21/0087; H01Q 21/28; H01Q 3/2682; H01Q 1/36; H01Q 1/38; H01Q 13/085; H01Q 21/00; H01Q 3/34; H01Q 3/36; H01Q 5/25; H01Q 25/02; H01Q 5/42; H01Q 11/08; H01Q 11/105; H01Q 23/00; H01Q 3/242; H01Q 3/2694; H01Q 3/28; H01Q 3/40; H01Q 9/30; H01Q 1/3275; H01Q 1/405; H01Q 3/22; H01Q 3/267; H01Q 9/0407; H01Q 9/42;
(Continued)

(56) References Cited

U.S. PATENT DOCUMENTS 2,589,664 A   3/1952   Bowman
2,612,606 A   9/1952   Stephen
(Continued)

FOREIGN PATENT DOCUMENTS

AU   2016219618 A1   9/2016
EP   0683399 A1   11/1995
(Continued)

OTHER PUBLICATIONS

U.S. Appl. No. 17/009,514, filed Sep. 1, 2020, entitled Embedded Antennas in Aerostructures and Electrically Short Conformal Antennas.
(Continued)

*Primary Examiner* — Ab Salam Alkassim, Jr.
(74) *Attorney, Agent, or Firm* — Suiter Swantz pc llo

(57) ABSTRACT

A system of high-frequency (HF) antennas is disposed on various aircraft body panels. The antennas are configured for orthogonal polarization such that NVIS may be operable no matter the state of the ionosphere. The antennas are disposed on substantially perpendicular body panels so that, when operated in concert, the resulting signals have opposite polarization and at least one signal will bounce off the ionosphere.

20 Claims, 7 Drawing Sheets

(58) Field of Classification Search
CPC ........ H01Q 1/48; H01Q 1/523; H01Q 13/106; H01Q 21/064; H01Q 21/26; H01Q 21/30; H01Q 5/28; H01Q 1/12; H01Q 1/2283; H01Q 1/288; H01Q 1/34; H01Q 1/42; H01Q 1/50; H01Q 13/06; H01Q 13/10; H01Q 15/24; H01Q 21/0018; H01Q 21/005; H01Q 21/08; H01Q 21/14; H01Q 25/001; H01Q 3/2605; H01Q 3/385; H01Q 3/44; H01Q 3/446; H01Q 5/50; H01Q 9/26; H01Q 9/28; H01Q 1/287; H01Q 1/3216; H01Q 1/52; H01Q 11/10; H01Q 13/0241; H01Q 13/0258; H01Q 13/0275; H01Q 13/12; H01Q 15/14; H01Q 19/13; H01Q 21/0043; H01Q 21/0056; H01Q 21/245; H01Q 21/29; H01Q 21/293; H01Q 3/30; H01Q 5/47; H01Q 5/55; H01Q 7/00; H01Q 9/0442; H01Q 9/0492; H01Q 9/32; H01Q 9/40; H01Q 9/46; H01Q 1/002; H01Q 1/02; H01Q 1/1214; H01Q 1/1257; H01Q 1/24; H01Q 1/244; H01Q 1/246; H01Q 1/30; H01Q 1/32; H01Q 1/362; H01Q 1/364; H01Q 13/00; H01Q 13/02; H01Q 13/0225; H01Q 13/025; H01Q 15/02; H01Q 15/148; H01Q 19/15; H01Q 21/0075; H01Q 21/067; H01Q 21/22; H01Q 25/002; H01Q 25/007; H01Q 3/02; H01Q 3/08; H01Q 3/2611; H01Q 3/2658; H01Q 3/2664; H01Q 3/2676; H01Q 3/38; H01Q 5/00; H01Q 5/307; H01Q 5/328; H01Q 5/385; H01Q 5/40; H01Q 9/145; H01Q 9/27; H01Q 9/285; H01Q 9/36

See application file for complete search history.

(56) References Cited

U.S. PATENT DOCUMENTS

| | | | |
|---|---|---|---|
| 2,685,029 A | 7/1954 | Lindenblad | |
| 2,700,104 A | 1/1955 | Bowman | |
| 2,701,307 A | 2/1955 | John | |
| 3,823,403 A | 7/1974 | Walter et al. | |
| 4,510,500 A | 4/1985 | Brune | |
| 5,032,844 A | 7/1991 | Hipp et al. | |
| 5,166,697 A | 11/1992 | Viladevall et al. | |
| 5,225,844 A * | 7/1993 | Williams | H01Q 1/28 343/705 |
| 5,315,309 A * | 5/1994 | Rudow | H01Q 1/28 343/705 |
| 5,646,633 A | 7/1997 | Dahlberg | |
| 6,061,022 A | 5/2000 | Menegozzi et al. | |
| 6,097,343 A | 8/2000 | Goetz et al. | |
| 6,300,918 B1 | 10/2001 | Riddle et al. | |
| 7,109,942 B2 | 9/2006 | McCarville et al. | |
| 7,274,338 B2 * | 9/2007 | Ozkar | H01Q 9/16 343/866 |
| 8,791,868 B2 * | 7/2014 | McCarthy | H01Q 5/357 343/705 |
| 9,716,322 B2 | 7/2017 | Holzheimer | |
| 9,893,414 B2 * | 2/2018 | Pascual Gil | H01Q 7/00 |
| 10,141,656 B2 | 11/2018 | Urcia et al. | |
| 10,290,931 B1 | 5/2019 | Judd | |
| 10,468,771 B2 | 11/2019 | Mentesana et al. | |
| 10,566,683 B1 * | 2/2020 | Campbell | H01Q 3/36 |
| 10,581,146 B2 | 3/2020 | Lavin et al. | |
| 10,644,384 B1 | 5/2020 | Ozdemir et al. | |
| 10,644,385 B1 * | 5/2020 | Greenwood | H01Q 3/32 |
| 11,258,167 B1 * | 2/2022 | Graf | H01Q 1/287 |
| 11,336,007 B1 * | 5/2022 | Graf | H01Q 1/523 |
| 11,437,803 B2 * | 9/2022 | Madhusudan | H02G 13/60 |
| 2003/0227422 A1 | 12/2003 | Berry et al. | |
| 2005/0007294 A1 | 1/2005 | Handelsman | |
| 2006/0290581 A1 | 12/2006 | Parsche | |
| 2008/0169988 A1 | 7/2008 | Deaett et al. | |
| 2010/0283693 A1 * | 11/2010 | Xie | H01Q 9/32 343/729 |
| 2011/0095951 A1 * | 4/2011 | McCarthy | H01Q 5/357 343/705 |
| 2014/0168018 A1 * | 6/2014 | Jeanneau | H01Q 1/50 29/601 |
| 2014/0320356 A1 * | 10/2014 | Bishop | H01Q 1/286 343/705 |
| 2016/0031568 A1 * | 2/2016 | Yokoi | H01Q 1/50 244/1 A |
| 2016/0172745 A1 * | 6/2016 | Keen | H01Q 1/50 29/601 |
| 2016/0294043 A1 * | 10/2016 | Pascual Gil | H01Q 1/287 |
| 2018/0166781 A1 | 6/2018 | Snyder et al. | |
| 2019/0341679 A1 * | 11/2019 | Ozdemir | H01Q 1/287 |
| 2020/0185830 A1 | 6/2020 | West | |
| 2020/0203803 A1 * | 6/2020 | Liu | H01Q 1/48 |
| 2020/0347826 A1 * | 11/2020 | Vinke | F03D 80/30 |
| 2022/0238986 A1 * | 7/2022 | Graf | H01Q 13/18 |

FOREIGN PATENT DOCUMENTS

| | | |
|---|---|---|
| GB | 654707 A | 6/1951 |
| GB | 766087 A | 1/1957 |
| GB | 1270219 A | 4/1972 |
| GB | 2474775 B | 10/2013 |
| WO | 1994021003 A1 | 9/1994 |

OTHER PUBLICATIONS

Extended Search Report in European Application No. 22150322.0 dated May 23, 2022, 10 pages.

* cited by examiner

MULTI-POLARIZATION HF NVIS FOR VERTICAL LIFT AIRCRAFT

BACKGROUND

In many applications, such as military applications, it is desirable to have multiple redundant options for beyond-line-of-sight communication. Traditionally, such communication is primarily via SATCOM and an alternative, high frequency (HF) near vertical incident skywave (NVIS) system capable of beyond-line-of-site communication via interaction with the ionosphere when SATCOM is unavailable. Unpredictable environmental variables are problematic for NVIS because a signal generated to accommodate one set of environmental characteristics may be ill-suited to a dynamic environment. Furthermore, it is difficult or impossible to anticipate the dynamic environment and maximize connectivity.

SUMMARY

In one aspect, embodiments of the inventive concepts disclosed herein are directed to a system of antennas disposed on various aircraft body panels. The antennas are configured for orthogonal polarization such that NVIS may be operable no matter the state of the ionosphere.

In a further aspect, antennas are disposed on substantially perpendicular body panels so that, when operated in concert, the resulting signals have opposite polarization.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
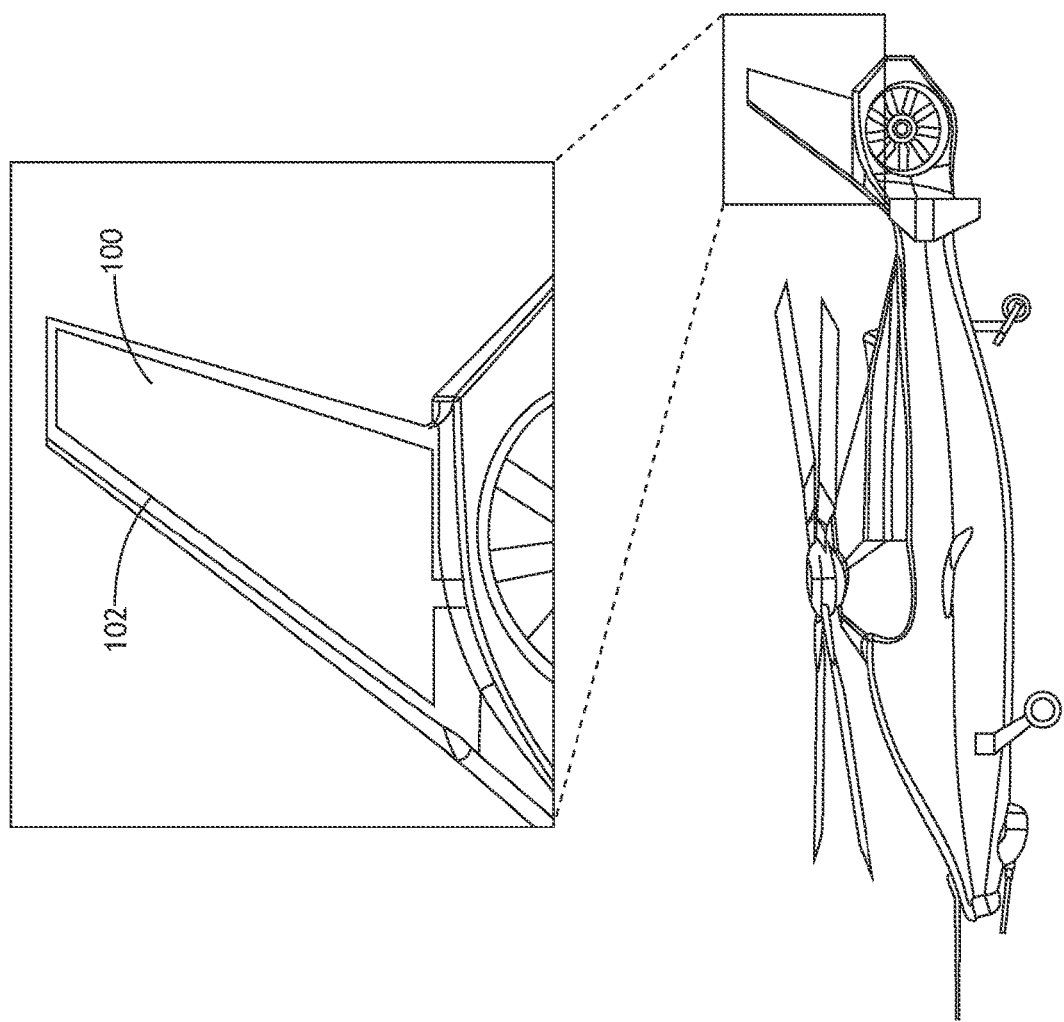
FIG. 1A shows a side view of an aircraft according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system of antennas disposed on various aircraft body panels. The antennas are configured for orthogonal polarization such that NVIS may be operable no matter the state of the ionosphere. In a further aspect, antennas are disposed on substantially perpendicular body panels so that, when operated in concert, the resulting signals have opposite polarization. Embodiments may be more fully understood with reference to U.S. patent application Ser. No. 17/009,514 which is hereby incorporated by reference.

Figure 1B:
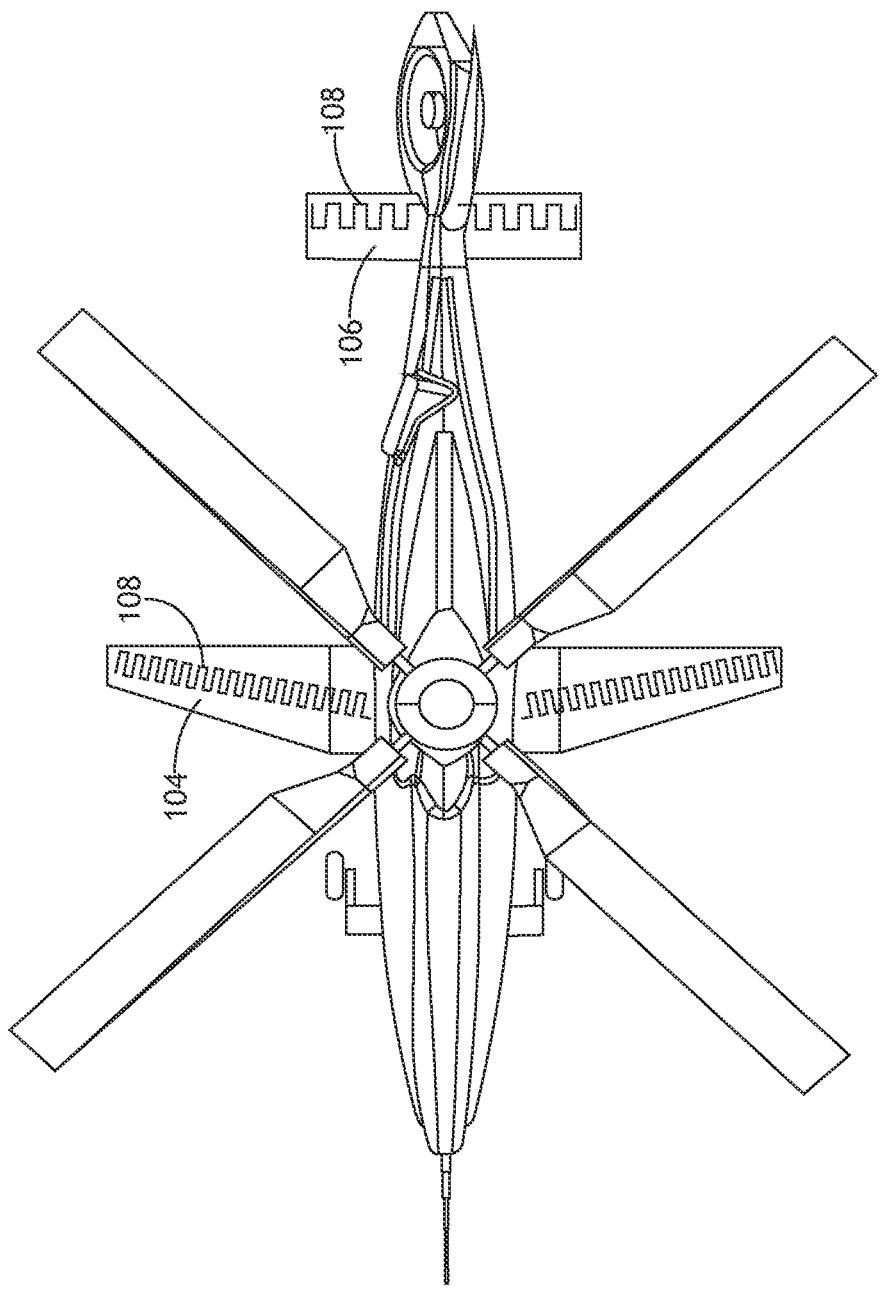
FIG. 1B shows a top view of an aircraft according to an exemplary embodiment.

Referring to FIGS. 1A-1B, side and top views of an aircraft according to an exemplary embodiment are shown. Vertical surfaces 100 such as vertical stabilizers include an incorporated antenna 102. Likewise, horizontal surfaces 104, 106 such as winglets 104 and horizontal stabilizers 106 include incorporated antennas 108. In at least one embodiment, the vertical surface antenna 102 is configured, physically or electronically, for vertical polarization while the horizontal surface antennas 108 are configured, physically or electronically, for horizontal polarization.

NVIS HF propagation is known to have both horizontal and vertical polarization attributes as dictated by sunspot/ionosphere physics. NVIS propagation/polarization is a function of sunspot cycles, transmit and receive launch angle, time of day, etc. Multi-polarization optimizes NVIS HF wave coupling for any instant conditions.

As an example of how these surfaces applies to HF, winglets 104 may be approximately two-hundred thirteen centimeters (seven feet), or about ½ a wavelength at seventy MHz or about ¼ wavelength at thirty MHz. Two winglets 104 in tandem each represent a ½ dipole arm. Antenna meandering, foreshortening, or reactive loading may enable HF NVIS. Some embodiments may effectively double fuselage surface area available for HF NVIS antennas by coupling across pairs of winglets 104.

In at least one embodiment, the vertical surface 100 may be vertically polarized via electrically small loop antennas, electric-magnetic antennas to maximize Wheeler-Chu volume, warp-around spirals, low power reactively tuned Structures, etc. Alternatively, the vertical surface 100 may be horizontally polarized via UWB slot antennas. Winglets 104 may be vertically polarized via vertical oriented concatenated reactive/ferrite loaded loops, bi-directional spiral antennas, dipole antennas, slot antennas, etc. where two winglet structures are connected. Alternatively, the winglets 104 may be horizontally polarized via printed planar UWB bicone antennas, meandered line antennas, helically loaded dipole antennas, low power reactively tuned structures, reconfigurable metallic patches or facets, etc.

In at least one embodiment, the vertical surface antenna 102 is a lumped reactive foreshortening non-meandered loop element and is integrated into the panel defining the vertical surface 100. Ferrite/material loading is possible.

In at least one embodiment, the antennas 102, 108 may be disposed on the corresponding surfaces 100, 104, 106. Alternatively, the antennas 102, 108 may be incorporated into the body panels, including corresponding isolation layers and insulating layers.

Figure 2:
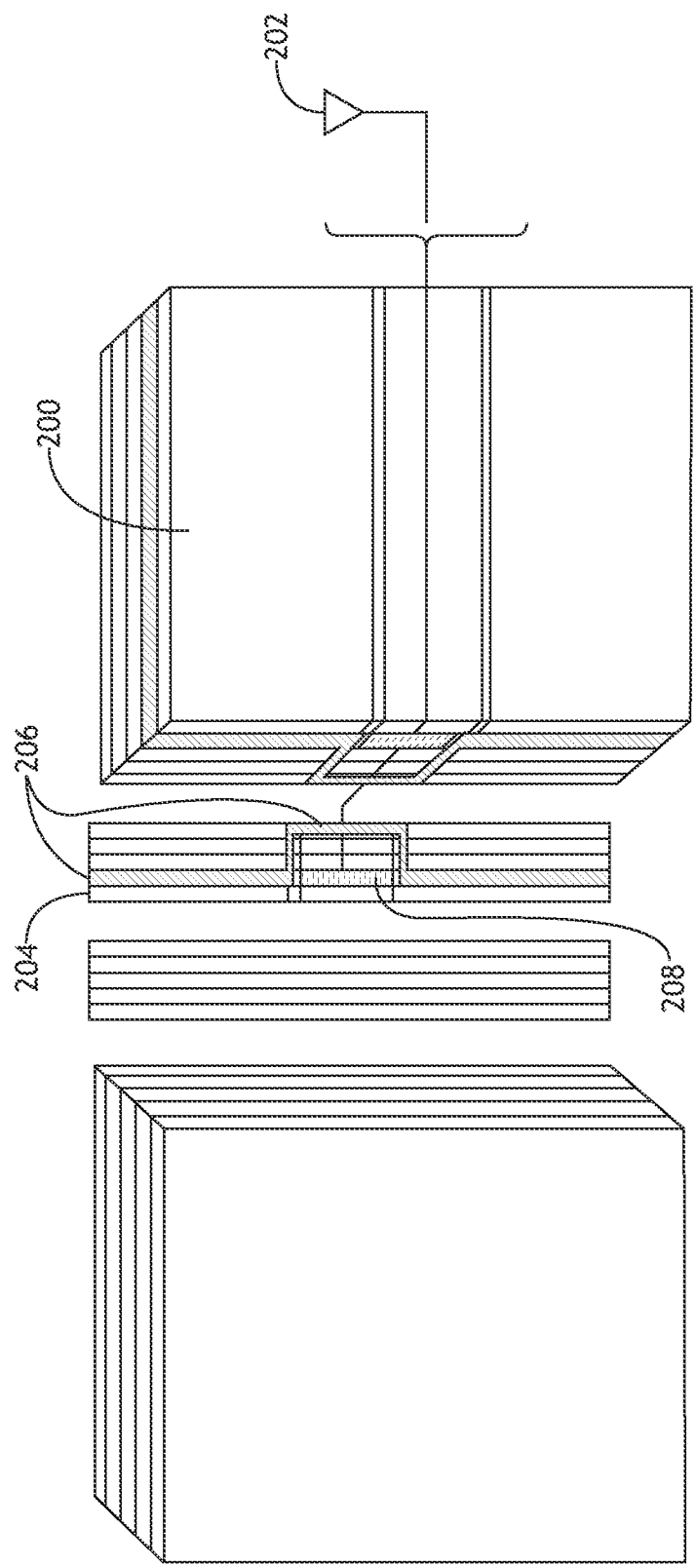
FIG. 2 shows a detail, cross-sectional view of a panel with an embedded HF antenna according to an exemplary embodiment.

Referring to FIG. 2, a detail, cross-sectional view of a panel 200 with an embedded HF antenna 202 according to an exemplary embodiment is shown. Panels 200 for a mobile platform such as an aircraft may comprise a composite of a plurality of layers 204, 206, 208. A top, insulating layer 204 overlays a lightning strike protection layer 206. The lightning strike protection layer 206 may interfere with signals to and from an antenna layer 208; therefore, where there is a separate antenna layer 208, the lightning strike protection layer 206, while still continuous, may recess beneath the antenna layer 208. The antenna layer 208 and an overlaying insulating layer 204 are thereby disposed flush with the surrounding insulating layer 204, and the embedded HF antenna 202 does not add additional drag to the aircraft in spite of the large overall size of the embedded HF antenna 202.

In at least one embodiment, the lightning strike protection layer 206 may comprise a portion of the embedded HF antenna 202. Conformal antennas may be created/embedded within the structural composite's screen mesh with lightening arrestment maintained within the panels. Lightning arrestment may be maintained by choking or surface currents trapping. The HF antenna can in principal be co-designed/integrated with the lightning arrestment panel/current suppression circuits. The HF antenna can be dual purposed to also provide lightning immunity.

Figure 3:
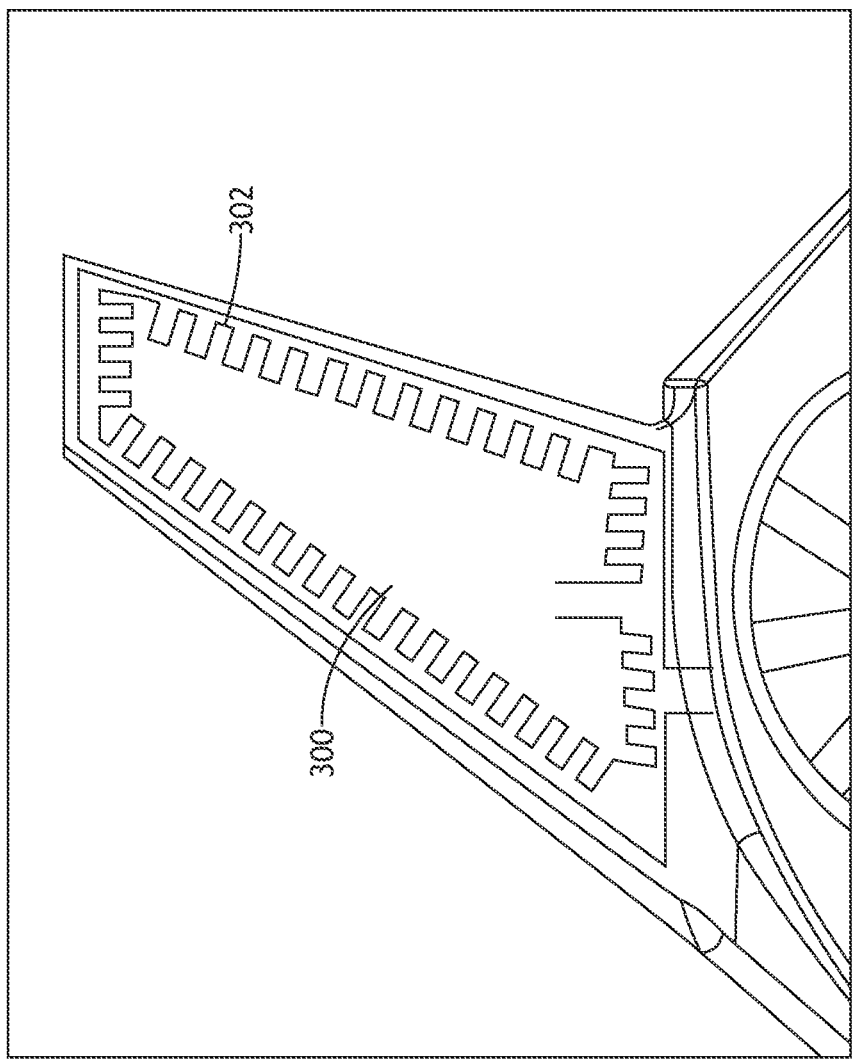
FIG. 3 shows a detail view of an aircraft panel according to an exemplary embodiment.

Referring to FIG. 3, a detail view of an aircraft panel 300 according to an exemplary embodiment is shown. The panel 300 includes an integrated lumped reactive foreshortening meandered element 302 (ferrite/material loading is possible). Feed elements or internal switches may enable switchable line length moderation for NVIS band tuning.

Figure 4:
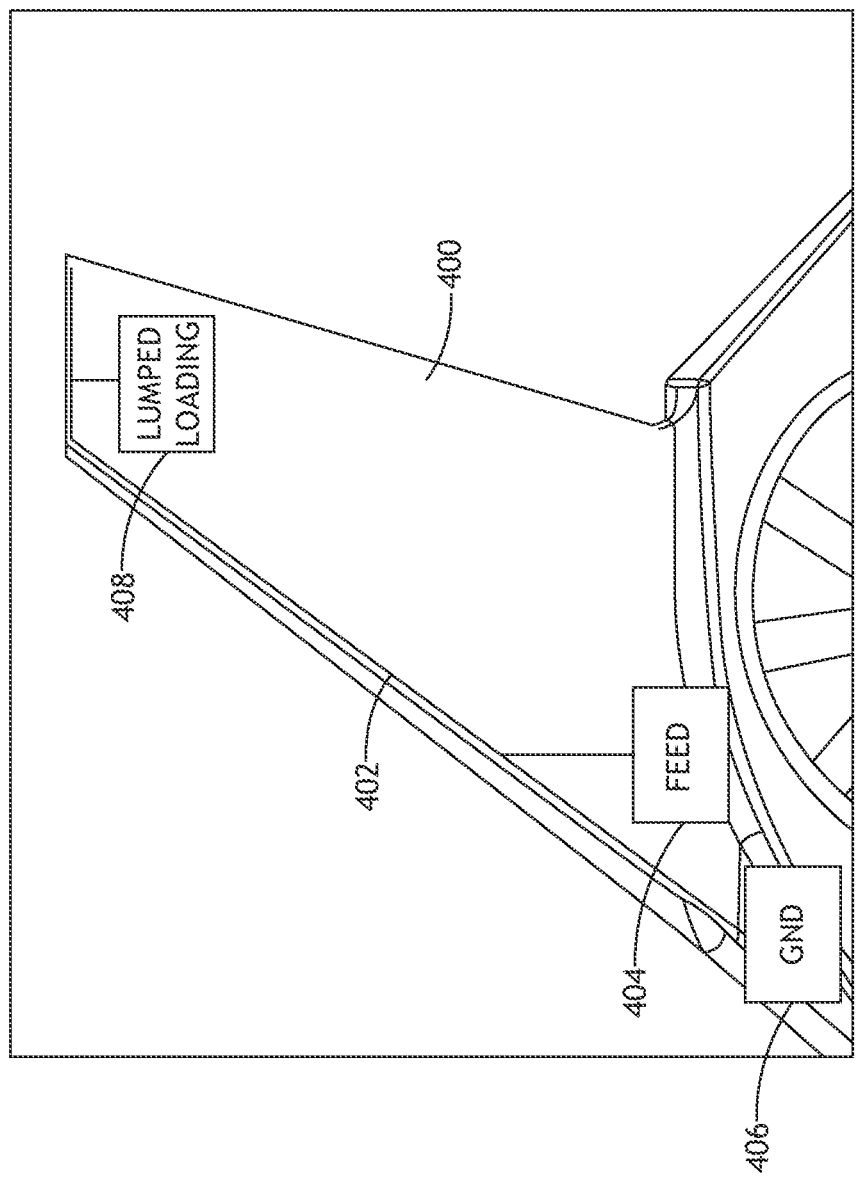
FIG. 4 shows a detail view of an aircraft panel according to an exemplary embodiment.

Referring to FIG. 4, a detail view of an aircraft panel according to an exemplary embodiment is shown. The panel 400 includes an antenna element 402 comprising an inverted F antenna with nonplanar ground 406. The antenna element can be meandered, line length switched, or lumped reactive loaded; these details are not shown in the simple sketch of FIG. 4. Feed elements 404 or internal switches may enable switchable line length moderation for NVIS band tuning. In at least one embodiment, a lumped loading reactive foreshortening element 408 may be included to increase inductance or for impedance matching and tuning.

Figure 5:
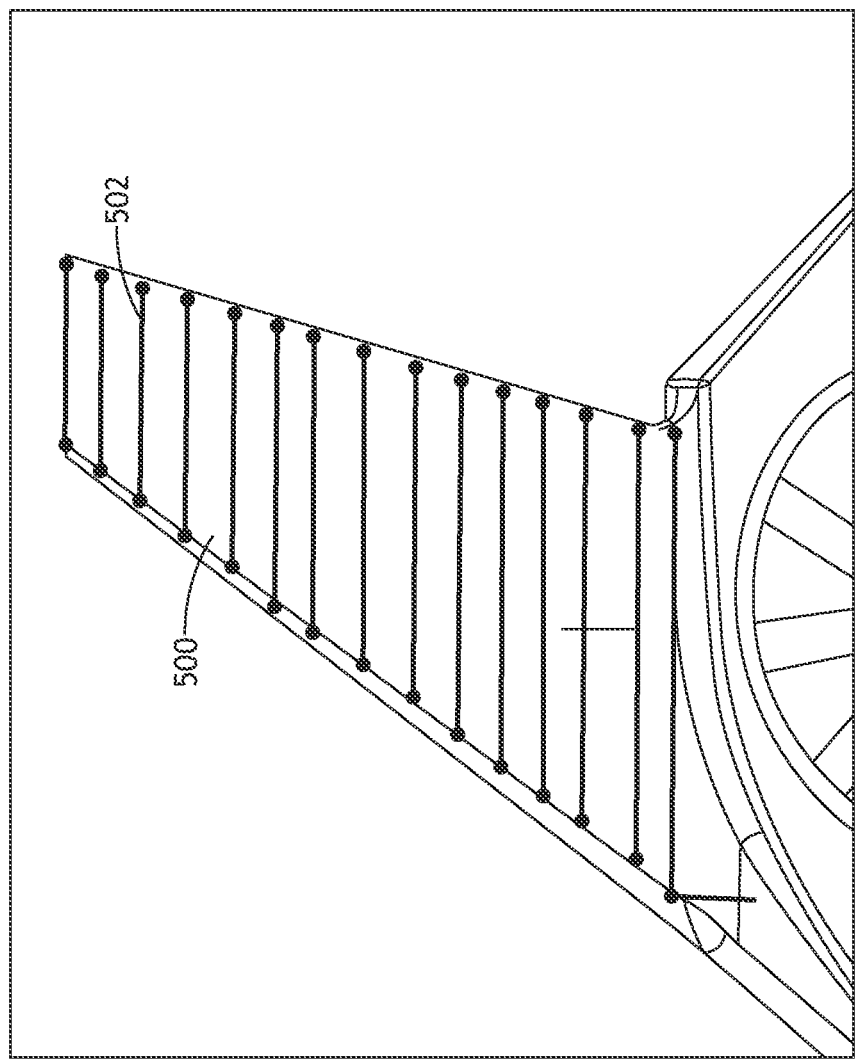
FIG. 5 shows a detail view of an aircraft panel according to an exemplary embodiment.

Referring to FIG. 5, a detail view of an aircraft panel according to an exemplary embodiment is shown. The panel 500 includes a distorted helical monopole antenna element 502. A high aspect ratio rectangular element is wrapped around or wrapped within the panel 500. The helix is either integrated during panel fabrication or implemented as an aerodynamically robust conformal blanket for post build installation.

In at least one embodiment, a lumped reactive foreshortening element may be integrated into the structure. Ferrite/material loading and switchable line length moderation for NVIS Band tuning is also envisioned.

Embodiments of the present disclosure may enable electronically switched in polarization for functionality to optimize wave coupling to compensate for NVIS propagation polarization fluctuations. Tactical NVIS comm link may be designed to preclude the need for antenna couplers and high output power amplifiers. Various functional aspects of the system may be maximized, including the volume of the ESA in accordance ESA theory, Wheeler-Chu limits, etc. Antenna shapes/structures may be adapted to be compatible with structural, environmental, and material constraints.

While specific embodiments have referred to HF frequency bands and NVIS, the principles and antenna systems are applicable to other frequency bands, especially VHF, UHF and L-band frequencies, as these are prime candidates for structural integration for drag reduction.

Figure 6:
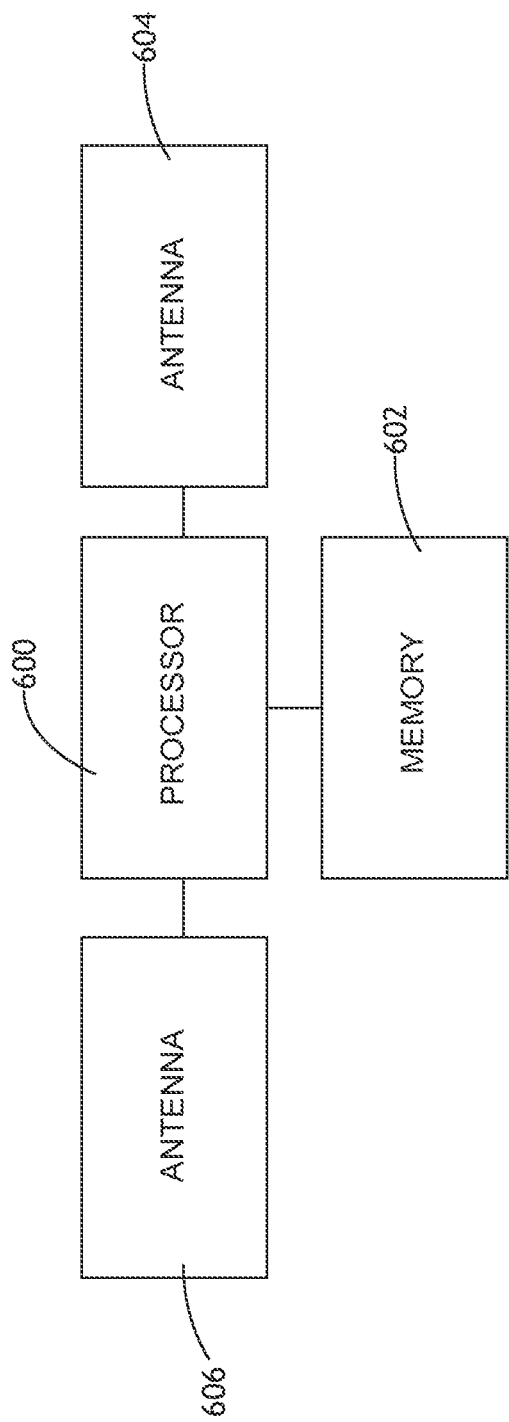
FIG. 6 shows a block diagram of a system useful for implementing exemplary embodiments.

Referring to FIG. 6 a block diagram of a system useful for implementing exemplary embodiments is shown. The system includes a processor 600 and at least two antennas 604, 606 having orthogonal polarization with respect to each other. The processor 600 may comprise a hardware defined processing element, field programmable gate array, general purpose processor configured via processor executable code stored in a memory 602, etc. In at least one embodiment, the processor 600 includes an RF transceiver which includes both the HF transmit and receive signal chains, including power amplifiers (PA), low-noise amplifiers (LNA) and analog-to-digital up and down conversion elements. In at least one embodiment, the processor receives signals from a first antenna 604 of arbitrary polarization, and signals from a second antenna 606 of orthogonal polarization with respect to the first antenna 604.

In at least one embodiment, the processor 600 performs signal strength analysis on the orthogonally polarized signals to identify which polarization is currently receiving the strongest signal, and utilize the antenna 604, 606 that receives the strongest instant at any time instant. Such signal strength analysis may be performed substantially continuously to always ensure the strongest signal is being utilized. Alternatively, signal strength analysis may be performed periodically.

In at least one embodiment, orthogonal signals from the antennas 604, 606 are continuously carried in separate, parallel channels. The processor 600 may perform digital signal processing on each channel and combine the output according to some resolution algorithm. Alternatively, some signal verification algorithm may be employed to verify the orthogonal signals against each other before digital signal processing.

In at least one embodiment, orthogonal signals in separate channels may be employed during transmission to generate circularly polarized signals.

Embodiment described herein have focused on horizontal polarization and vertical polarization, however it may be appreciated that any orthogonal polarization may be employed.

In at least one embodiment, an optimal polarization state for both transmission and reception (for example, horizontal, vertical, or circular) may be identified using Ionospheric propagation prediction models executed by the processor 600, or by some other processing element embedded into a transceiver digital signal processor, or by performing a transmit and receive polarization rotation signal search based on amplitude or phase or both. Alternatively, or in addition, a multi-step search algorithm may comprise an initial polarization rotation search based on computer predictions and then a signal-to-noise ratio, optimized through a real-time polarization rotation measurement search.

In at least one embodiment, the antennas 604, 606 may comprise characteristic mode current transducers that excite radiating surface currents on an aircraft. The aircraft's structural surface may be partitioned to be excited with a characteristic mode current transducer sub-aerostructure designed for a given polarization state, and a second characteristic mode current transducer sub-aerostructure designed for an orthogonal polarization state.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft antenna system comprising:
at least two antennas, each corresponding to an aircraft body panel;
a common feed network configured to drive each of the at least two antennas; and
at least one processor connected to the common feed network and a memory for storing processor executable code,
wherein:
a first antenna in the at least two antennas is configured for horizontal polarization;
a second antenna in the at least two antennas is configured for vertical polarization; and
each aircraft body panel comprises a continuous lightning strike protection layer disposed to be coplanar with the corresponding antenna, except where the corresponding antenna is disposed in the aircraft body panel, where the continuous lighting strike protection layer is recessed below the corresponding antenna.

2. The aircraft antenna system of claim 1, wherein the at least two antennas comprise high-frequency (HF) loops.

3. The aircraft antenna system of claim 1, wherein the at least two antennas comprise HF meandered loops.

4. The aircraft antenna system of claim 1, wherein the at least two antennas comprise monopoles.

5. The aircraft antenna system of claim 1, wherein the at least two antennas comprise distorted helical monopoles.

6. The aircraft antenna system of claim 1, wherein the at least one processor is configured to:
receive a return signal;
identify which of the first antenna or second antenna received a stronger return signal;
determine a current desirable polarization based on a known polarization of the first antenna or second antenna; and
communicate the current desirable polarization to nearby platforms.

7. An aircraft comprising:
at least two body panels, each comprising at least one high-frequency (HF) antenna;
a common feed network configured to drive each antenna of the at least two body panels; and
at least one processor connected to the common feed network and a memory for storing processor executable code,
wherein:
a first body panel antenna is configured for a first polarization;
a second body panel antenna is configured for a second polarization; and
each body panel comprises a continuous lightning strike protection layer disposed to be coplanar with the corresponding HF antenna, except where the corresponding HF antenna is disposed in the aircraft body panel, where the continuous lighting strike protection layer is recessed below the corresponding HF antenna.

8. The aircraft of claim 7, wherein:
the first polarization comprises a right-handed circular polarization; and
the second polarization comprises a left-handed circular polarization.

9. The aircraft of claim 7, wherein the processor is configured via processor executable code stored in the memory to:
produce a first signal in a first channel associated with the first body panel antenna;
produce a second signal in a second channel associated with the second body panel antenna; and
produce a circularly polarized signal via a combination of the first signal and the second signal.

10. The aircraft of claim 7, wherein the HF antennas comprise HF meandered loops.

11. The aircraft of claim 7, wherein the HF antennas comprises a characteristic mode transducers configured and disposed to induce radiating surface currents in the corresponding first body panel antenna and second body panel antenna.

12. The aircraft of claim 7, wherein the HF antennas comprise distorted helical monopoles.

13. The aircraft of claim 7, wherein the at least one processor is configured to:
execute a predictive polarization algorithm to identify a preliminary polarization channel;
receive a first signal via the first body panel antenna;
receive a second signal via the second body panel antenna;
calculate a signal-to-noise ratio for each of the first signal and second signal;
compare the signal-to-noise ratios to identify a superior polarization channel; and
compare the superior polarization channel to the preliminary polarization channel.

14. A system of antennas comprising:
at least two high-frequency (HF) antennas each embedded in a body panel;
a common feed network configured to drive each of the at least two HF antennas; and
at least one processor connected to the common feed network and a memory for storing processor executable code,
wherein:
a first antenna in the at least two HF antennas is configured for a first polarization;
a second antenna in the at least two HF antennas is configured for a second polarization; and
each body panel comprises a continuous lightning strike protection layer disposed to be coplanar with the corresponding HF antenna, except where the corresponding HF antenna is disposed in the body panel, where the continuous lighting strike protection layer is recessed below the corresponding HF antenna.

15. The system of antennas of claim 14, wherein:
the first polarization comprises a right-handed circular polarization; and
the second polarization comprises a left-handed circular polarization.

16. The system of antennas of claim 14, wherein the at least two antennas comprise high-frequency (HF) loops.

17. The system of antennas of claim 14, wherein the at least two antennas comprise HF meandered loops.

18. The system of antennas of claim 14, wherein the at least two antennas comprise monopoles.

19. The system of antennas of claim 14, wherein the at least two antennas comprise distorted helical monopoles.

20. The system of antennas of claim 14, wherein:
the first polarization comprises a horizontal polarization; and
the second polarization comprises a vertical polarization.

* * * * *